United States Patent
Kudou

(10) Patent No.: US 7,123,278 B2
(45) Date of Patent: Oct. 17, 2006

(54) LED PRINTER AND IMAGE FORMING APPARATUS INCLUDING THE SAME

(75) Inventor: Kunio Kudou, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 260 days.

(21) Appl. No.: 10/793,927

(22) Filed: Mar. 8, 2004

(65) Prior Publication Data

US 2005/0062838 A1    Mar. 24, 2005

(30) Foreign Application Priority Data

Mar. 19, 2003   (JP) .............................. 2003-076388

(51) Int. Cl.
*B41J 2/45* (2006.01)
(52) U.S. Cl. ..................................... 347/130
(58) Field of Classification Search ................ 347/130, 347/131, 237, 247, 180
See application file for complete search history.

(56) References Cited

U.S. PATENT DOCUMENTS

| | | |
|---|---|---|
| 4,183,653 A | 1/1980 | Satomi et al. |
| 4,885,613 A | 12/1989 | Kudoh |
| 4,914,476 A | 4/1990 | Nishitsuji et al. |
| 4,969,016 A | 11/1990 | Kudoh |
| 6,400,854 B1 | 6/2002 | Kudoh |
| 6,538,679 B1 | 3/2003 | Hiyoshi |

FOREIGN PATENT DOCUMENTS

| | | | |
|---|---|---|---|
| JP | 10-086438 | * | 4/1998 |
| JP | 2001-080118 | * | 3/2001 |
| JP | 2003-266771 | * | 9/2003 |

* cited by examiner

*Primary Examiner*—Huan Tran

(57) ABSTRACT

An LED printer capable of avoiding unevenness in the intensity of light depending on positions over all of the illumination areas divided in the direction of main scan, and an image forming apparatus including the LED printer. The LED printer comprises an LED array unit made up of an LED array having a plurality of LED's arrayed to lie in one direction and a focusing device for focusing light from the LED array onto an image carrier of the image forming apparatus, an image data transfer control device for dividing and transferring image data, which has been transferred to it, for each of a plurality of the multiple LED array units arranged in a zigzag pattern in an axial direction of the image carrier, a dividing device for dividing an area of the LED array unit energized to illuminate at a time into plural parts, an LED illumination control device for controlling the intensity of emitted light for each of the areas energized to illuminate at a time, and an LED illumination control device for controlling the intensity of emitted light for each of the LED array units.

11 Claims, 12 Drawing Sheets

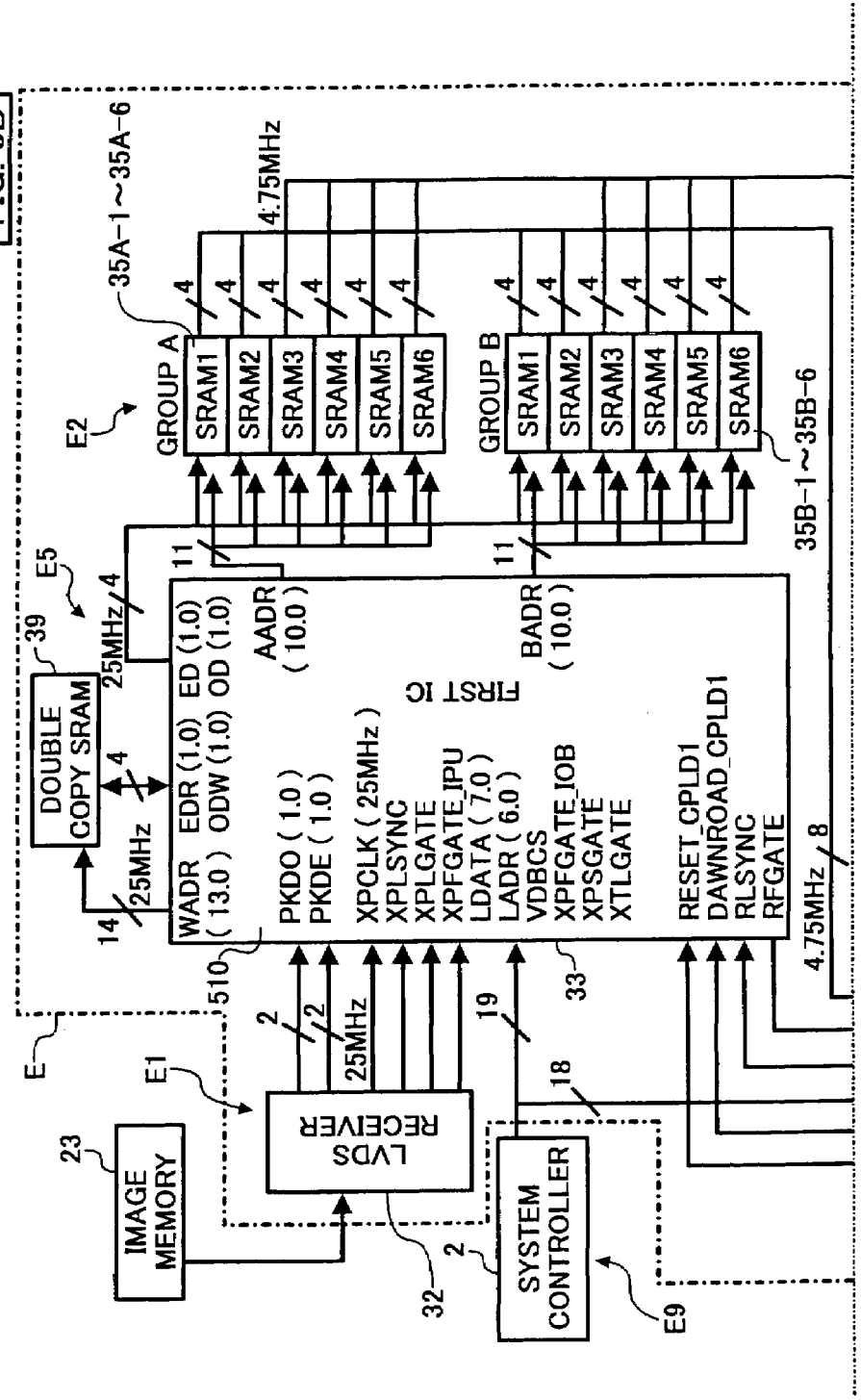

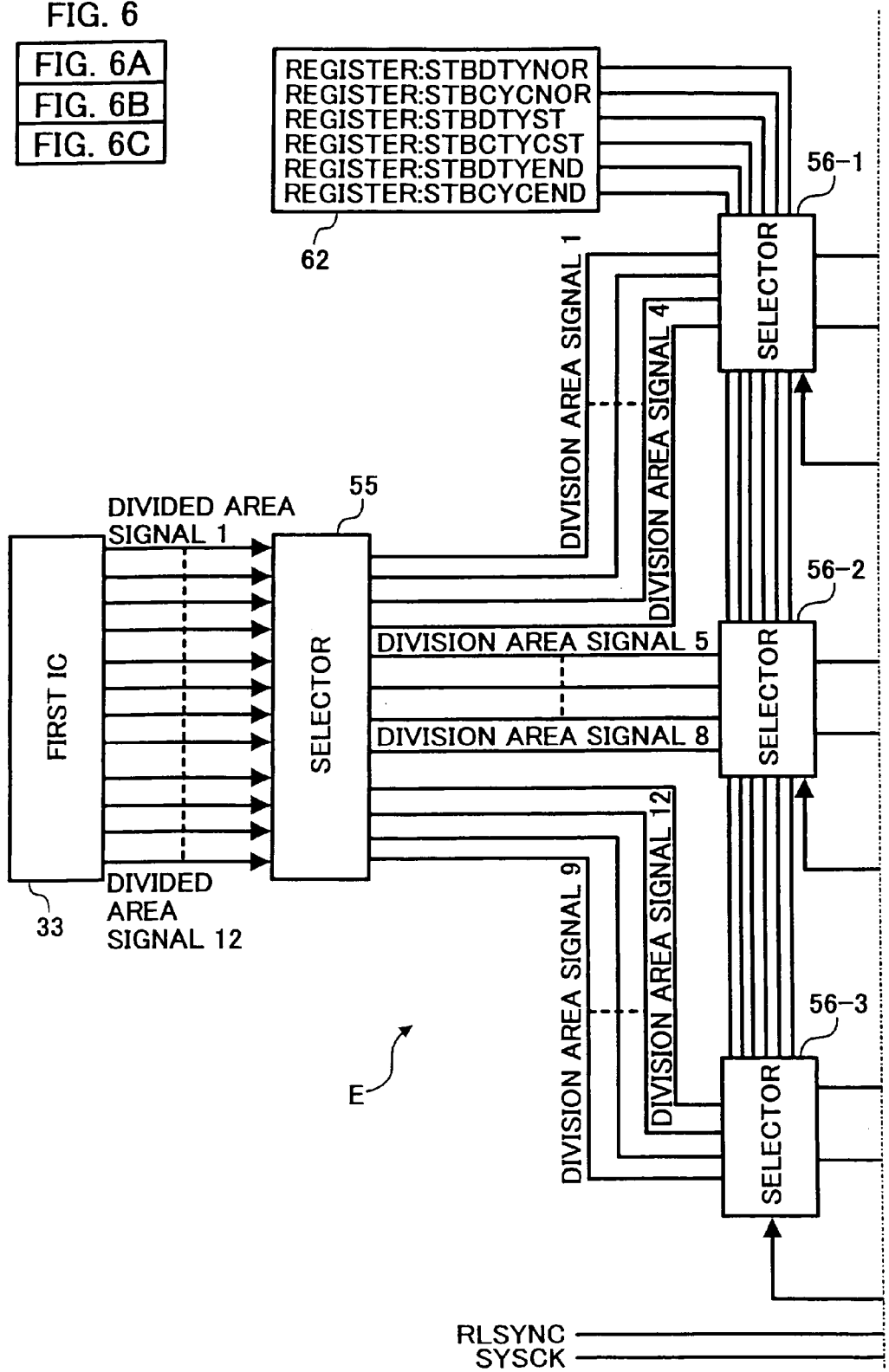

LED PRINTER AND IMAGE FORMING APPARATUS INCLUDING THE SAME

BACKGROUND OF THE INVENTION

1. Field of the Invention

The present invention relates to an LED (Light Emitting Diode) printer for forming a digital image by writing printing information on a photoconductor as an image carrier, with a light beam from an LED array and also relates to a copier, printer, facsimile apparatus or similar image forming apparatus including the LED printer.

2. Description of the Related Art

There is hitherto known an LED printer wherein a LED head group is constituted by a plurality of LED heads arrayed in the axial direction of a photoconductor as an image carrier of an image forming apparatus. An example of such an LED printer is disclosed in Japanese Unexamined Patent Application Publication No. 10-86438. There is also known an LED printer wherein a maximum photoconductive area width in the axial direction of a photoconductor can be subjected to exposure in divisions with a plurality of LED heads. Another example of such an LED printer is disclosed in Japanese Unexamined Patent Application Publication No. 2001-80118.

More specifically, in the LED printer disclosed in the above-cited Japanese Unexamined Patent Application Publication No. 10-86438, the LED head group is constituted by a plurality of LED heads arrayed in the axial direction of the photoconductor, and a maximum photoconductive area width in the axial direction of the photoconductor can be subjected to exposure in divisions with each of the LED heads. Furthermore, a plurality of LED heads may be arranged in a zigzag pattern in the axial direction of the photoconductor such that opposite end areas of adjacent exposable regions are overlapped with each other in the axial direction of the photoconductor. In addition, an odd number of three or more LED heads may be arranged in a zigzag pattern such that the number of the LED heads is larger on the upstream side in the rotating direction of the photoconductor than on the downstream side.

On the other hand, in the LED printer disclosed in the above-cited Japanese Unexamined Patent Application Publication No. 2001-80118, the maximum photoconductive area width in the axial direction of the photoconductor can be subjected to exposure in divisions with a plurality of LED heads, and the brightness of light is adjusted for each of the LED heads in an independent manner so as to eliminate unevenness in printing density caused by differences in brightness among the LED heads. Although no suggestion is made of the problem that unevenness in printing density occurs within the LED head among divided illumination areas thereof when an image is printed, it is proposed to eliminate unevenness in the intensity of light within an LED array unit by controlling the intensity of light for each of the divided illumination areas within the LED array unit.

Generally, an LED printer has high reliability because of employing no moving part, such as a polygon mirror used in a laser printer. Also, in the case of a printer requiring an output of a large-sized print, because the LED printer does not need an optical space for scanning a light beam in the direction of main scan, it is just required to dispose an LED head comprising an LED array and an optical element, e.g., a SELFOC lens, thus resulting in a reduction of the overall printer size. In recent years, therefore, LED printers have been widely used as ones substituted for laser printers.

In a laser printer, one light source with an output power of about 10 mW is energized to emit a laser beam that is scanned by a polygon mirror, an fθ lens, etc. On the other hand, in an LED printer, a plurality of LED's are arrayed in the direction of main scan in one-to-one relation to one pixel, and a current of about several to 10 mA is supplied to each of the LED's, thereby causing the LED to emit a light beam. Data transfer and illumination are controlled for each LED.

Accordingly, in a large-sized printer or copier, the number of driver IC's for driving the LED's increases and production yields reduce correspondingly. Another problem is that, because of necessity of improving the accuracy of parts to maintain the accuracy in array of write beams, the part price per piece is much higher in the large-sized printer or copier than in a small-sized printer or copier. For that reason, a printer is also proposed in which a plurality of LED array units each used in a small-sized inexpensive printer or copier are arranged in the direction of main scan so that a large-sized print can be outputted.

In the LED printer disclosed in the above-cited Japanese Unexamined Patent Application Publication No. 10-86438, two or three LED array units are arranged along the axis of the photoconductor and are subjected to exposure in divisions. The exposure in divisions is usually carried out, for example, by a dynamic method of illuminating LED's to make a scan in the direction of main scan on the dot-by-dot basis, or a static method of illuminating LED's all together or for each of several blocks at a time in the direction of main scan. That known LED printer employs the static method. Further, in that known LED printer, each LED array unit is divided into four parts for individual illuminations, and three LED array units are arranged to lie in one direction. As a whole, therefore, that known LED printer operates in a mode of illumination in 12 divisions.

Although there is no problem when an image is dark, a problem occurs in the case of a light image (low density) in that the image density changes across a boundary between the divided illumination areas. The reason is as follows. When the LED array unit is divided into plural areas, it is unavoidable that illumination areas at opposite ends are narrower in some actual use than inner illumination areas. This causes a difference in voltage drop attributable to, e.g., a difference in impedances of cables extended from a power supply, whereby larger currents are supplied to the illumination areas at the opposite ends and the intensity of light emitted from those illumination areas are relatively increased. In the case of a halftone image, therefore, the illumination areas at the opposite ends provide a higher image density, i.e., a darker image, than the inner illumination areas adjacent to the formers, thus resulting in unevenness in density. Further, a variation among the three LED array units depending on production lots also causes unevenness in the intensity of light in a halftone image.

In other words, unevenness in density occurs not only among the LED array units, but also among the divided illumination areas within one LED array unit. Hence, compensation of the intensity of light for each of the LED array units is not enough to satisfactorily deal with such a problem of unevenness in density.

SUMMARY OF THE INVENTION

It is an object of the present invention to provide an LED printer capable of avoiding unevenness in the intensity of light depending on positions over all of the illumination areas divided in the direction of main scan.

It is another object of the present invention to provide an image forming apparatus including the LED printer.

A light emitting diode (LED) printer of the present invention writes a digital image on an image carrier of an image forming apparatus. The LED printer comprises an LED array unit made up of an LED array having a plurality of LED's arrayed to lie in one direction and a focusing device configured to focus light from the LED array onto the image carrier, an image data transfer control device configured to divide and transfer image data, which has been transferred to the image data transfer control device, for each of a plurality of the multiple LED array units arranged in a zigzag pattern in an axial direction of the image carrier, a dividing device configured to divide an area of the LED array unit energized to illuminate at a time into plural parts, a first LED illumination control device configured to control the intensity of emitted light for each of the areas energized to illuminate at a time, and a second LED illumination control device configured to control the intensity of emitted light for each of the LED array units.

An image forming apparatus for forming a digital image in accordance with the present invention includes an image carrier on which the digital image is formed and a light emitting diode (LED) printer for writing the digital image on the image carrier. The LED printer comprises an LED array unit made up of an LED array having a plurality of LED's arrayed to lie in one direction and a focusing device configured to focus light from the LED array onto the image carrier, an image data transfer control device configured to divide and transfer image data, having been transferred to the image data transfer control device, for each of a plurality of the multiple LED array units arranged in a zigzag pattern in an axial direction of the image carrier, a dividing device configured to divide an area of said LED array unit energized to illuminate at a time into plural parts, a first LED illumination control device configured to control the intensity of emitted light for each of the areas energized to illuminate at a time, and a second LED illumination control device configured to control the intensity of emitted light for each of the LED array units.

A method of writing a digital image on an image carrier of an image forming apparatus in accordance with the present invention comprises the steps of providing an LED array unit made up of an LED array having a plurality of LED's arrayed to lie in one direction and focusing means for focusing light from the LED array onto the image carrier, dividing and transferring image data, which has been transferred to the image data transfer control means, for each of a plurality of the multiple LED array units arranged in a zigzag pattern in an axial direction of the image carrier, dividing an area of the LED array unit energized to illuminate at a time into plural parts, controlling the intensity of emitted light for each of the areas energized to illuminate at a time, and controlling the intensity of emitted light for each of the LED array units.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

The present invention will be described in detail below with reference to the drawings.

Figure 1:
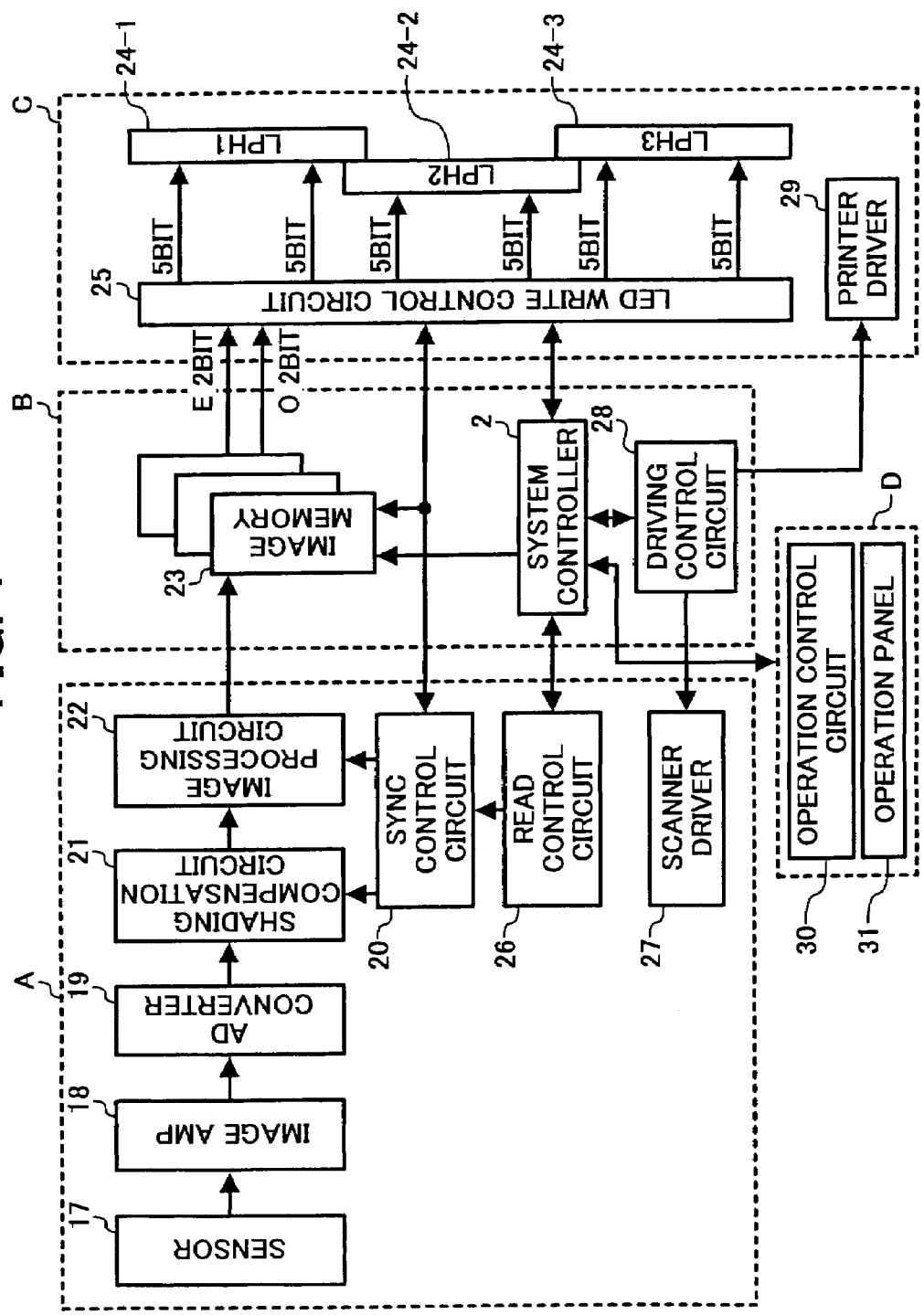
FIG. 1 is a block diagram showing a configuration of an LED printer according to an embodiment of the present invention.
Figure 2:
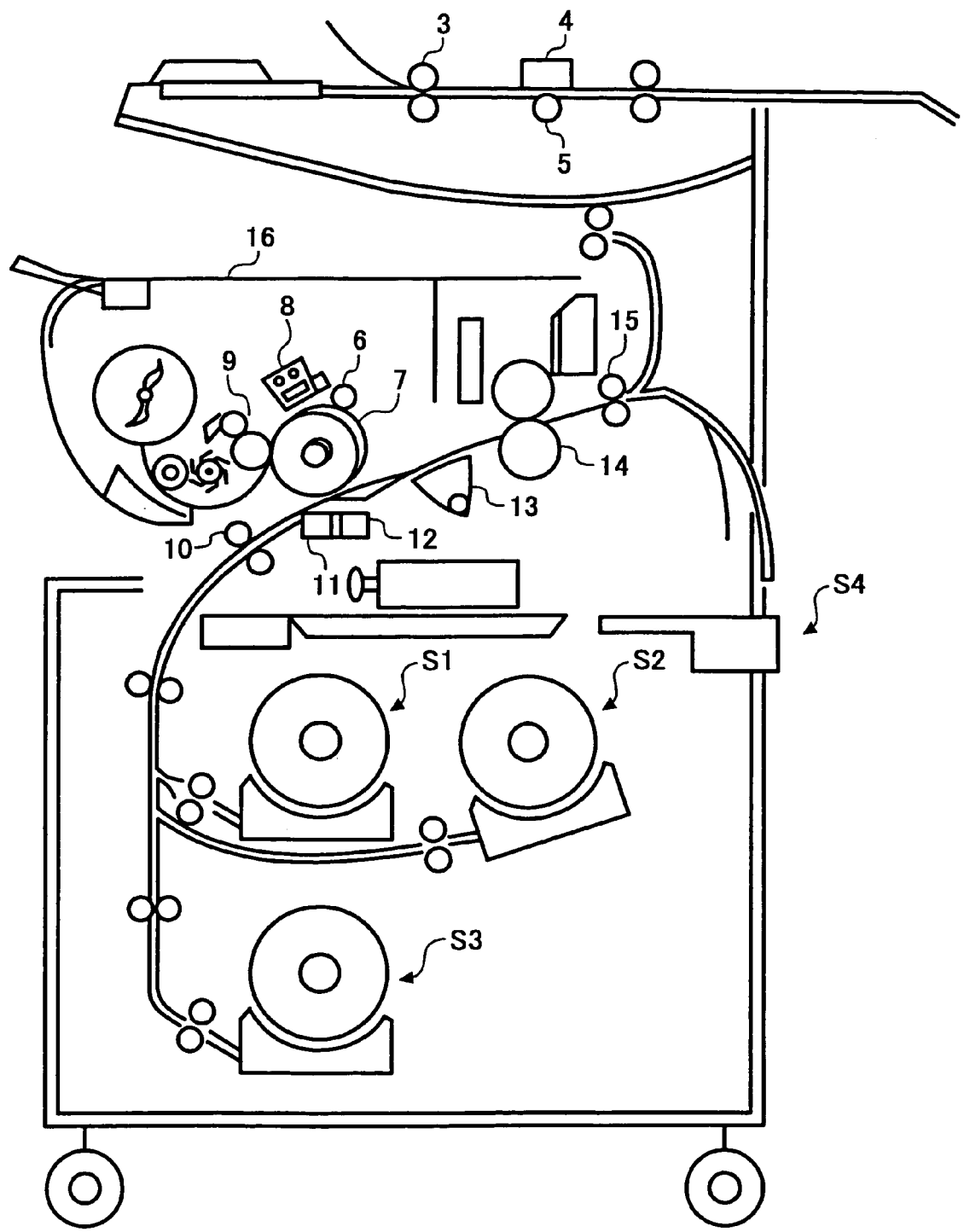
FIG. 2 is a side view showing a schematic construction of a copier to which the LED printer is applied.

FIG. 1 shows a configuration of an LED printer according to an embodiment of the present invention. As shown, a printer 1 of this embodiment comprises a read section A serving as a read means for reading a document, an image information storage section B serving as a storage means for storing the read document information, a write section C for executing a series of processes for copying the stored information to transfer paper, and an operating section D serving as an operating means for entering key-inputs into a system controller 2 of the image information storage section B. Incidentally, FIG. 2 shows a schematic construction of a copier to which the LED printer shown in FIG. 1 is applied.

Those sections will be described below one by one with reference to FIGS. 1 and 2.

A description is first made of the read section A. As shown in FIG. 2, when an operator inserts a document through an inlet, the document is advanced through a gap between a contact sensor module 4 and a white roller 5 with the rotation of a pair of rollers 3. During the advance, the document is illuminated by an LED lamp disposed in the contact sensor module 4, and light reflected by the document is focused on a sensor 17 in the contact sensor module 4. Image information of the document is thus read. A document image focused on the sensor 17 in the read section A, shown in FIG. 1, is converted to an electrical analog signal. This analog signal is amplified by an image amplifier 18. An A/D converter 19 converts the analog image signal having been amplified by the image amplifier 18 to a multi-value digital image signal per pixel. The converted digital image signal is outputted in sync with a clock outputted from a sync control circuit 20.

Subsequently, in a shading compensation circuit 21, the digital image signal is compensated for distortions caused by, e.g., unevenness in the intensity of light, stains of a contact glass, and unevenness in the sensor sensitivity. The compensated digital image information is converted to digital recording image information by an image processing circuit 22, and is then written in an image memory 23 of the image information storage section B.

A description is next made of the write section C. A charging device 6 shown in FIG. 2 is a so-called scorotron charger provided with a grid for uniformly charging a photoconductor drum 7 to −850 V. An LED array unit 8 is made up of LED's arranged in the form of a regular array, and light emitted from the LED array unit 8 is illuminated to the photoconductor drum 7 through an SLA (SELFOC Lens Array). The LED array unit 8 corresponds to LPH1 24-1 to LPH3 24-3 shown in FIG. 1.

When the LED light modulated in accordance with the digital image information is illuminated to the photoconductor drum 7, electric charges on the surface of the photoconductor drum 7 are caused to flow into the ground of the photoconductor drum 7 and to disappear based on the photoconductive phenomenon. On that occasion, the LED's corresponding to a light (low density) area of the document are controlled not to emit the light, while the LED's corresponding to a dark (high density) area of the document are controlled to emit the light. As a result, an electrostatic latent image corresponding to the dark and light areas of the document image is formed on the LED-light illuminated surface of the photoconductor drum 7. The electrostatic latent image is developed by a developing unit 9. Toner in the developing unit 9 is charged to be negative under stirring and is applied with a bias of 700 V. Hence, the toner adheres to only the LED-light illuminated areas.

On the other hand, transfer paper serving as a recording material is supplied from selected one of three roll paper feeders S1 to S3 and a manual paper feed unit S4, and is advanced by a pair of register rollers 10 so as to pass under the photoconductor drum 7 at the predetermined timing. While passing under the photoconductor drum 7, a toner image is transferred to the transfer paper with a transfer charger 11. Then, the transfer paper is separated from the photoconductor drum 7 with a separation charger 12 and is sent to a fixing unit 14 by a transport tank 13. In the fixing unit 14, the toner is fixed to the transfer paper. The transfer paper to which the toner has been fixed is sent to a paper discharge tray 16 by a pair of paper discharge rollers 15.

A flow of the image signal from the image memory 23 to the write section (copying apparatus) C will be described below.

The image signal flows such that 4-value image data Even (E: 2 bits) and Odd (O: 2 bits) are sent from the image memory 23 to an LED write control circuit 25 at 25 MHz in parallel via two lines. The image signals sent via the two lines are combined together in one line within the LED write control circuit 25. The combined image signal is then divided into two parts for each of the LED array units, i.e., into six parts as a whole. The divided image signals are transferred respectively to the LED array units 24-1, 24-2 and 24-3 at 9.5 MHz.

Additionally, as shown in FIG. 1, the LED printer further comprises a read control circuit 26, a scanner driver 27, a driving control circuit 28, a printer driver 29, an operation control circuit 30, and an operating panel 31.

Figure 3B:
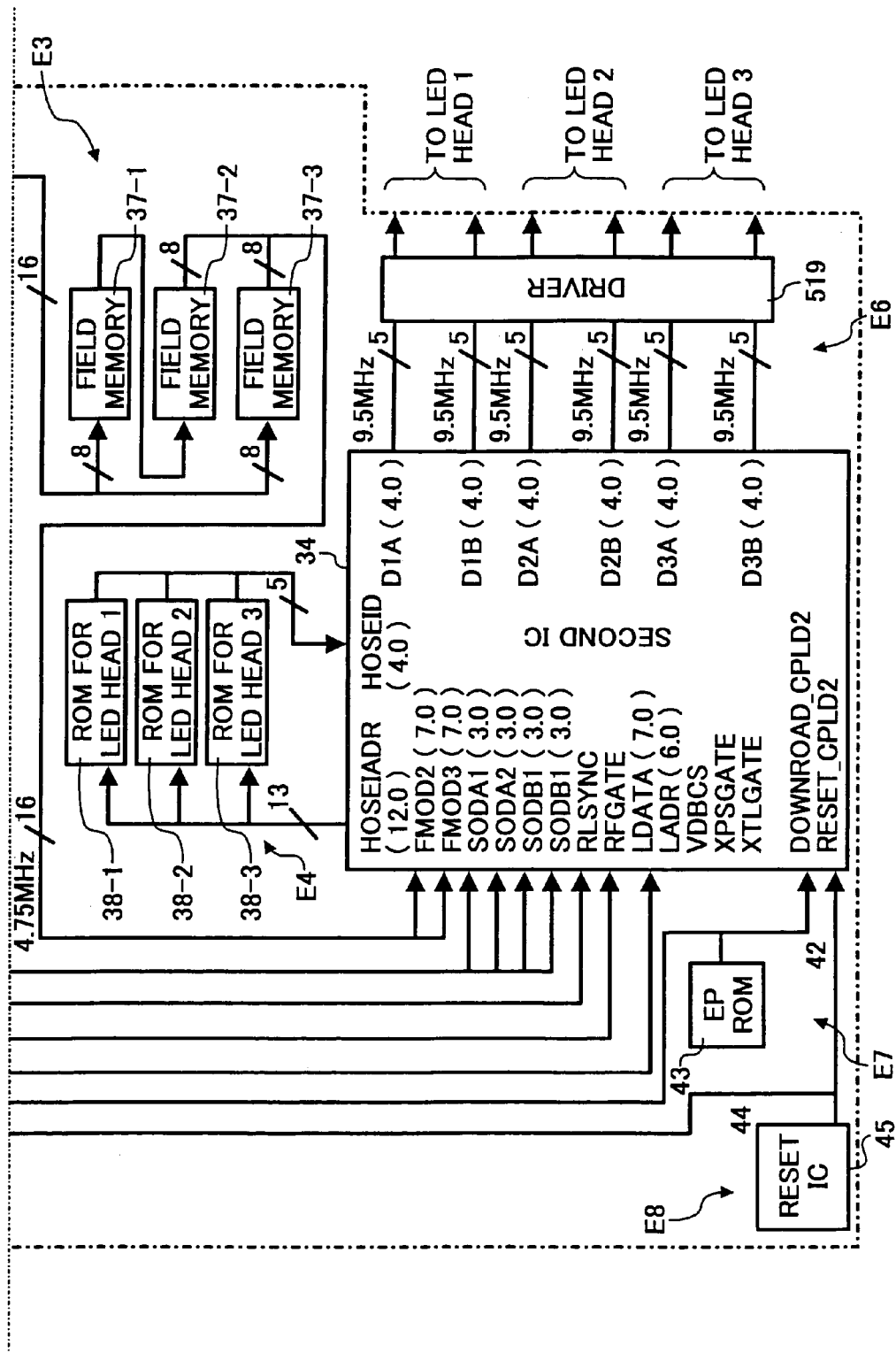
FIG. 3 is a circuit diagram showing a detailed configuration of each block of an LED write control circuit in the LED printer.

FIG. 3 shows a detailed configuration of each block of the LED write control circuit 25 shown in FIG. 1.

An image data input section E1 will first be described. The image signals Even (E: 2 bits) and Odd (O: 2 bits) and timing signals are sent from the image data memory (image memory) 23 after being converted from parallel to serial signals with an LVDS driver for low-voltage operating signal devices. Because those signals are sent to the LED write control circuit 25 at 25 MHz, the LED write control circuit 25 employs an LVDS receiver 32 for conversion from serial to parallel signals. Resulting parallel image signals are inputted, as PKDE, PKDO, XPCLK, XPLSYNC, XPLGATE and XPFGATE_IPU, to a first IC 33. Resulting timing signals XPLSYNC and XPFGATE_IPU are delayed by an image signal processing time in sync with an internal clock of the first IC 33 and are inputted as RLSYNC and RFGATE, respectively, to a second IC 34.

An image data RAM section E2 will next be described. The image signals inputted to the first IC 33 are outputted, as ED (2 bits) and OD (2 bits), to a group A of six SRAM's 35A-1 to 35A-6 and a group B of six SRAM's 35B-1 to 35B-6 at 25 MHz along with SRAM address signals AADR (10..0) and BADR(10..0). The LED array units 24-1 to 24-3 have a total dot number of 23040 (7680 dots covering the width of an A3 sheet×3 units) and transfer the image signals in 6 divisions (2 divisions per unit×3 units). Therefore, six SRAM1-6 35A-1 to 35A 6 are each provided as the group A per division of one LED array unit having the A3-sheet width, which corresponds to 3840 dots (7680 dots /2 divisions).

The image signals for one line in the direction of main scan are loaded as follows while one address is allocated to each 2-dot image data with 4 bits (ED: 2 bits, OD: 2 bits). The image signals for the first division of the LED array unit 24-1 are loaded in the SRAM1 35A-1 of the group A, and the image signals for the second division of the LED array unit 24-1 are loaded in the SRAM2 35A-2.

Also, the image signals for the first division of the LED array unit 24-2 are loaded in the SRAM3 35A-3, and the image signals for the second division of the LED array unit 24-2 are loaded in the SRAM4 35A-4. Further, the image signals for the first division of the LED array unit 24-3 are loaded in the SRAM1 35A-5, and the image signals for the second division of the LED array unit 24-3 are loaded in the SRAM6 35A-6.

The image signals having been successively loaded in the six SRAM1-6 35A-1 to 35A-6 of the group A at 25 MHz are simultaneously read out of the six SRAM1-6 35A-1 to 35A-6 of the group A at 4.65 MHz. The image signals for the LED array unit 24-1, which have been read out of the SRAM1 35A-1 and the SRAM2 35A-2, are inputted to the second IC 34 as SODA1(3..0) and SODA2(3..0), respectively.

The image signals for the LED array unit 24-2, which have been read out of the SRAM3 35A-3 and the SRAM4 35A-4, and the image signals for the LED array unit 24-3, which have been read out of the SRAM5 35A-5 and the SRAM6 35A-6, are sent to field memories 37-1 to 37-3 in an image-data delay memory section E3.

While the image signals are read out of the six SRAM1-6 35A-1 to 35A-6 of the group A, the image signals for the next line are simultaneously loaded in the six SRAM1-6 35B-1 to 35B-6 of the group B in a similar manner to the above-described loading process for the group A.

Those read and write operations are toggled between the group A of the six SRAM1-6 35A-1 to 35A-6 and the group B of the six SRAM1-6 35B-1 to 35B-6.

A description is now made of the image signal delay units (field memories) 37-1 to 37-3 in the image-data delay memory section E3 in relation to the LED array unit 24-2. The three LED array units 24-1 to 24-3 each having the A3-sheet width are arranged in a zigzag pattern such that, from the viewpoint of mechanical layout, the LED array unit 24-2 is mounted in a position 7 mm offset in the direction of sub-scan from the LED array unit 24-1 as a reference. Accordingly, if the image signals outputted from the group A of the six SRAM1-6 35A-1 to 35A-6 and the group B of the six SRAM1-6 35B-1 to 35B-6 are processed at the same timing and transferred to the LED array units 24-1 to 24-3 as they are, the LED array unit 24-2 prints an image in a position 7 mm (i.e., 165 lines=7 mm/42.3 □m (1 dot at 600 dpi)) offset in the direction of sub-scan from an image printed by the LED array unit 24-1.

To compensate for such an image offset caused by the mechanical layout, the image signals (each having 4 bits) for the two divisions of the LED array unit 24-2, which have been read out of the SRAM3 35A-3 and the SRAM4 35A-4 at 4.75 MHz, are written, as 8-bit image signals, into the field memory 37-1 at 4.75 MHz to fill a storage area corresponding to 100 lines (fixed) in the same order as they have been transferred.

Subsequently, the image signals are read out of the field memory 37-1 at 4.75 MHz in the same order as they have been written, and at the same time the read image signals are written into the field memory 37-2, which is cascaded to the field memory 37-1, to fill a storage area corresponding to 65 lines (variable). Then, the image signals are read out of the field memory 37-1 at 4.75 MHz in the same order as they have been written, and are inputted as FMOD2(7..0) to the second IC 34. As a result, the image signals for the LED array unit 24-2 are delayed in time corresponding to 165 lines (7 mm).

The number of lines by which the image signals are to be delayed differ depending on variations in accuracy of parts and assembly of the LED array unit 24-2, and the delay can be controlled in units of one line (42.3 µm).

For the LED array unit 24-3, the image-data delay memory section E3 operates as follows. For the same reason as described above, the LED array unit 24-3 is mounted in a position 1 mm offset in the direction of sub-scan from the LED array unit 24-1. Accordingly, the image signals (each having 4 bits) for the two divisions of the LED array unit 24-3, which are outputted from the SRAM5 35A-5 and SRAM6 35A-6 of the group A and the SRAM5 35B-5 and SRAM6 35B-6 of the group B, are delayed in time corresponding to 23 lines (1 mm) and outputted as FMOD3(7..0).

A light intensity compensation ROM section E4 will be described below. The LED array units 24-1, 24-2 and 24-3 are associated with light intensity compensation ROM's 38-1, 38-2 and 38-3, respectively, which store 5-bit compensation data per LED for compensating variations in the intensity of light among the individual LED's and compensation data per LED array chip, i.e., in units of 192 LED's.

Upon power-on, those compensation data for compensating variations in the intensity of light are transferred to the LED array units 24-1 to 24-3. More specifically, upon power-on or after resetting of the LED write control circuit 25, the light intensity compensation data are first read out of the light intensity compensation ROM 38-1 for the LED array unit 24-1 in order from 0000 H in response to address signals HOSEIADR(12..0) sent from the second IC 34, and then inputted as HOSEID(4..0) to the second IC 34.

In the second IC 34, after latching the data at 0000 h (i.e., the compensation data for the first dot), both the data at 0000 h and the data at 0001 h (i.e., the compensation data for the 3841st dot) are simultaneously transferred to the LED array unit 24-1 in parallel at 9.5 MHz. This process is repeated until reaching 1E28 h (i.e., until preparing 7720 sets of compensation data) for the light intensity compensation of the LED array unit 24-1.

After transferring the compensation data for the LED array unit 24-1, the light intensity compensations of the LED array units 24-2 and 24-3 are successively performed in a similar manner. The transferred light intensity compensation data are held in the LED array units 24-1 to 24-3 unless the LED array units 24-1 to 24-3 are powered off.

A double copy SRAM section E5 will be described below. The double copy SRAM section E5 has the function of printing or copying the same image with a size of 420 mm (length of an A2 sheet) at maximum in the direction of main scan side by side on a sheet with a size of 841 mm (length of an A0 sheet) at maximum, thereby doubling the productivity in processing of a printer. In the double copy mode, the image signals (E, O) are transferred from the image data memory section 23 to the LED write control circuit 25 at ½ or less of the timing signal XPLSYNC. By utilizing that feature, dubbing of the image signals is performed within one XPLSYNC.

More specifically, the image signals (E, O) sent from the image data memory section 23 at 25 MHz are outputted, as EDW and ODW, from the first IC 33 to a double copy SRAM 39 along with address signals WADR(13..O). Thus, the image data are loaded in the double copy SRAM 39, and at the same time they are also loaded in the six SRAM1-6 35A-1 to 35A-6 of the group A in the image data RAM section E2. As soon as the loading of the image signals from the image data memory section 23 is completed, the image data loaded in the double copy SRAM 39 is read and taken into the first IC 33 to be additionally loaded in the six SRAM1-6 35A-1 to 35A-6 of the group A similarly to the image data sent from the image data memory section 23.

As a result, a double copy image for one line in the direction of main scan is loaded in the six SRAM1-6 35A-1 to 35A-6 of the group A. By repeating the above-described operation while toggling the group A of the six SRAM1-6 35A-1 to 35A-6 and the group B of the six SRAM1-6 35B-1 to 35B-6, the image data for respective lines are formed in succession.

An image data output section E6 will be described below. After being inputted to the second IC 34, the image signals in units of 2 dots for the LED array units 24-1 to 24-3 are combined to form data for one line within the second IC 34. The image signals for the first and second divisions of the LED array unit 24-1 are outputted respectively as D1A and D1B, the image signals for the first and second divisions of the LED array unit 24-2 are outputted respectively as D2A and D2B, and the image signals for the first and second divisions of the LED array unit 24-3 are outputted respectively as D3A and D3B from the second IC 34 with the timing signals. Then, those image signals are transferred to the corresponding LED array units 24-1 to 24-3 at a speed of 9.5 MHz through a driver 41.

A download section E7 will be described below. Because the first IC 33 and the second IC 34 are SRAM type CPLD's, control programs written in the first IC 33 and the second IC 34 are all erased upon power-off. For that reason, each time power is turned on, the programs are downloaded (for setting of configuration) from an EPROM 43.

Upon power-on, the program is downloaded to the first IC 33 by being transferred as DOWNLOAD_CPLD1 in the form of serial data from the EPROM 43 to the first IC 33. As soon as the downloading of the program into the first IC 33 is completed, the program is downloaded to the second IC 34 by being transferred as DOWNLOAD_CPLD2 in the form of serial data from the EPROM 43 to the second IC 33.

A reset circuit section E8 will be described below. Upon power-on or in the event of a drop of source voltage supplied to the LED write control circuit 25, system reset signals RESET_CPLD1 and RESET_CPLD2 are outputted from a reset IC 45. The system reset signal RESET_CPLD1 is inputted to the first IC 33 and the system reset signal RESET_CPLD2 is inputted to the second IC 34. Counters in the first IC 33 and the second IC 34 are reset in response to the respective system reset signals, whereby the system is initialized.

A condition setting section E9 will be described below. Setting of conditions (such as double copy on/off and size of a data-written sheet) for writing of the image data into the LED write control circuit 25 is controlled by entering input data bus control signals LDATA(7..0), address bus control signals LADR(6..0), a latch signal VDBCS, and image transfer signals XPFGATE_JOB XPSGATE and XTLGATE to both the first IC 33 and the second IC 34 from the system controller 2.

Figure 4:
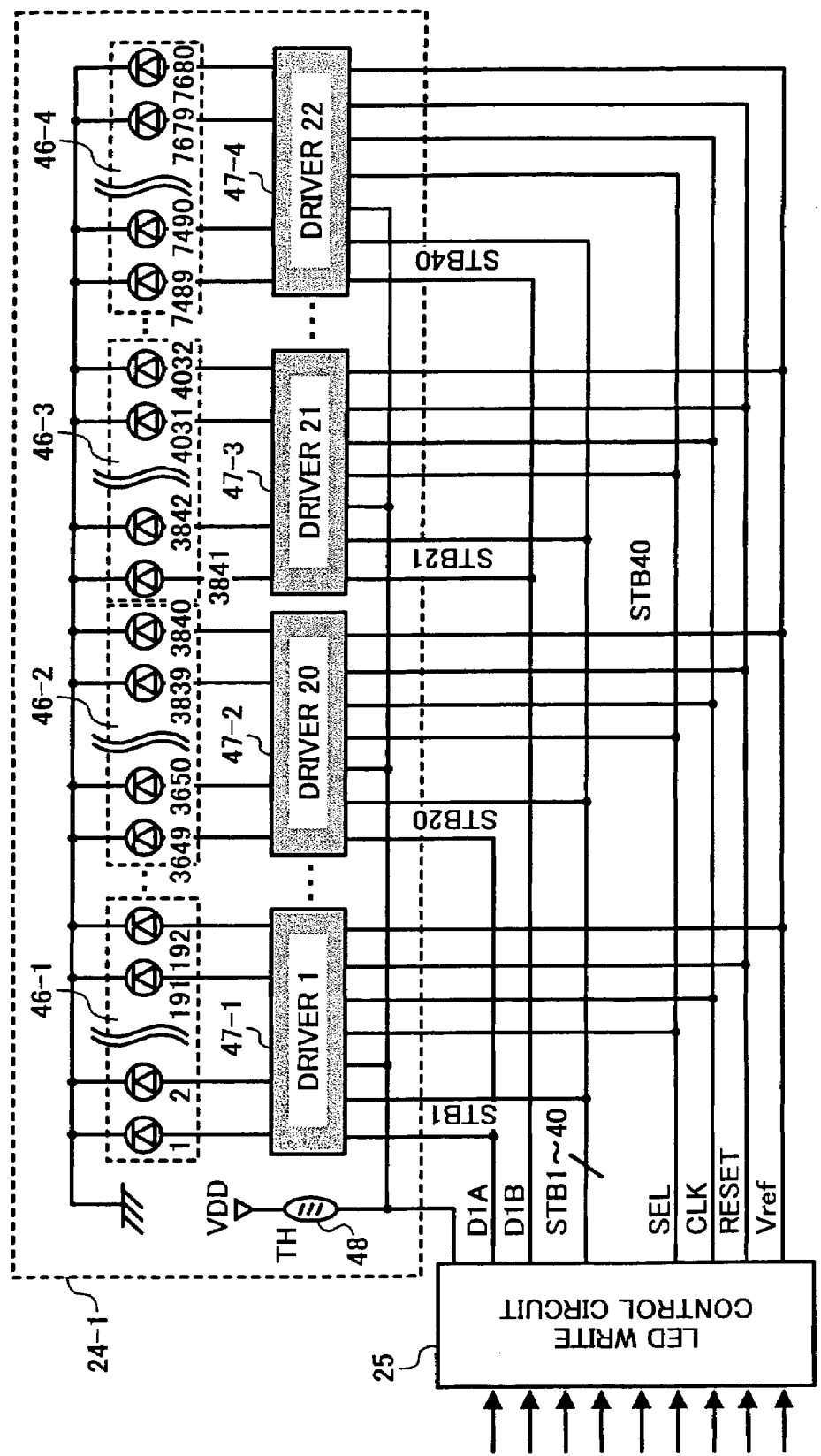
FIG. 4 is a circuit diagram showing a configuration of one LED array unit in the LED printer.

One 24-1 of the LED array units 24-1 to 24-3 will be described in more detail below with reference to FIG. 4.

The LED array unit 24-1 is divided into 40 sets of LED arrays 46-1 to 46-4 in units of 192 LED's (192×40=7680 dots), which are arrayed at equal intervals in the direction of main scan. The LED arrays are connected in one-to-one relation to driver IC's (Driver 1 to Driver 40) 47-1 to 47-4 for controlling the intensity of light emitted from each array.

Each of the driver IC's 47-1 to 47-4 is connected to the LED write control circuit 25 to receive, as input signals, image data corresponding to each dot, a strobe signal STB for illuminating the LED for a time during which the strobe signal STB is supplied, a clock CLK for data transfer, a set signal RESET (LOAD) for starting the data transfer, and a signal SEL for switching a mode between light intensity compensation and gradation control of an ordinary image.

Also, a chip thermistor 48 is mounted to a heat sink or a printed board and is connected to each of the driver IC's 47-1 to 47-4 for detecting the temperature to control temperature compensation of each LED current. The voltage from the chip thermistor 48 is inputted to the LED write control circuit 25 as well for monitoring of the temperature.

Further, a current supplied to each LED array unit can be adjusted with a Vref signal from the LED write control circuit 25, thereby compensating variations in the intensity of emitted light caused for each of the LED array units depending on production lots.

Figure 5:
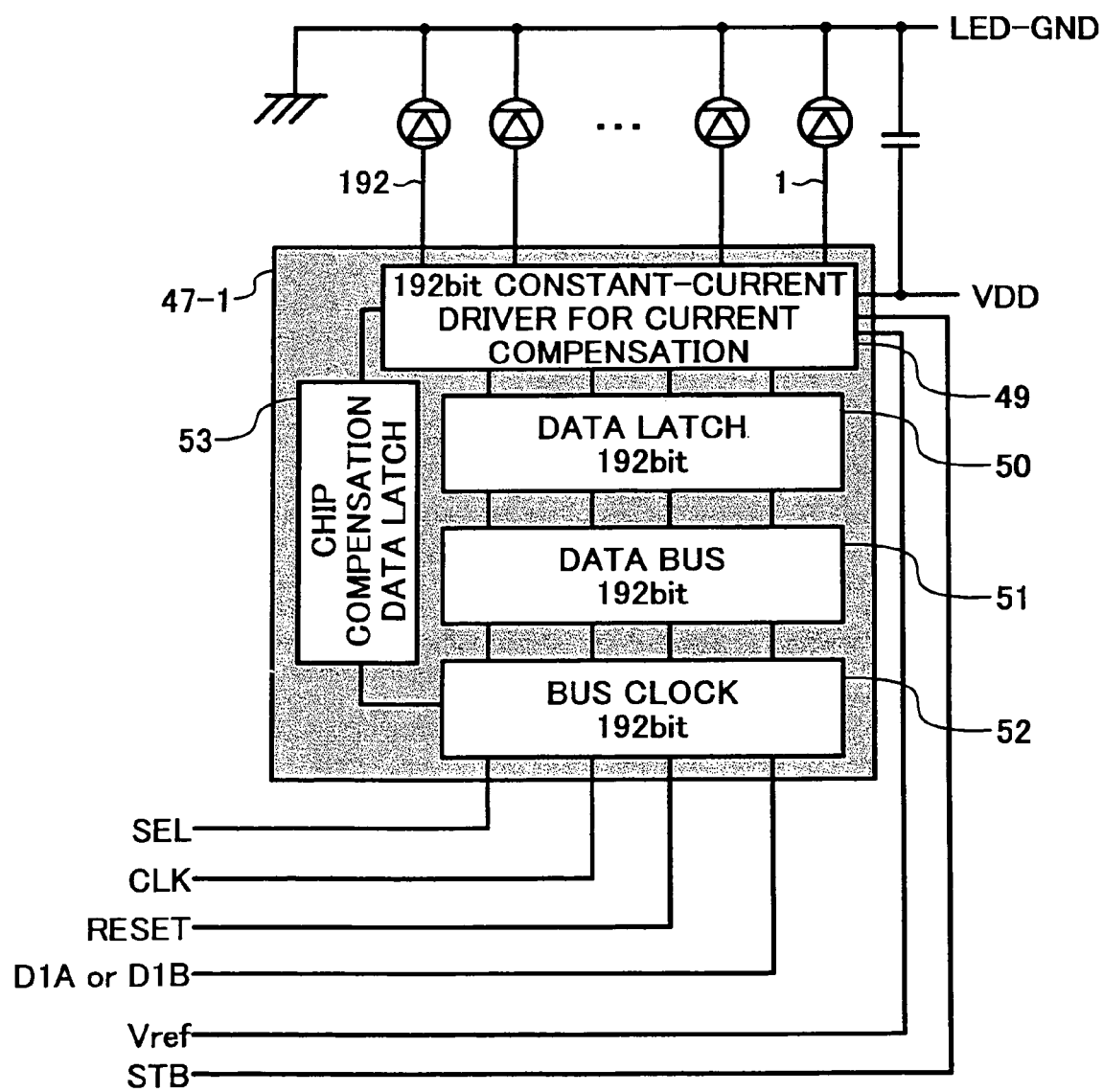
FIG. 5 is a circuit diagram showing an inner circuit configuration of one driver IC in the LED array unit.

An internal circuit configuration of one 47-1 of the driver IC's 47-1 to 47-4 will be described below with reference to FIG. 5.

The signals SEL, D1A or D1B (image data), CLK, and RESET inputted from the LED write control circuit 25 are transferred to a bus clock 52 in the driver IC 47-1. The signal SEL serves as a signal for switching the mode of transferring the LED light intensity compensation data upon power-on and the ordinary gradation control mode. The LED light intensity compensation data is transferred to a chip compensation data latch block 53 only at the initial power-on timing or at the specified timing, and is transferred to the data bus 51 during the ordinary gradation control.

Then, the data outputted from the data bus 51 is latched by a data latch 50 for the gradation control and is transferred to a constant-current driver 49. The constant-current driver 49 executes the compensation in accordance with the signal Vref and the compensation in accordance with the light intensity compensation data transferred from the chip compensation data latch block 53, followed by emission of light from each LED in response to the signal STB that energizes the LED to emit the light.

Figure 6B:
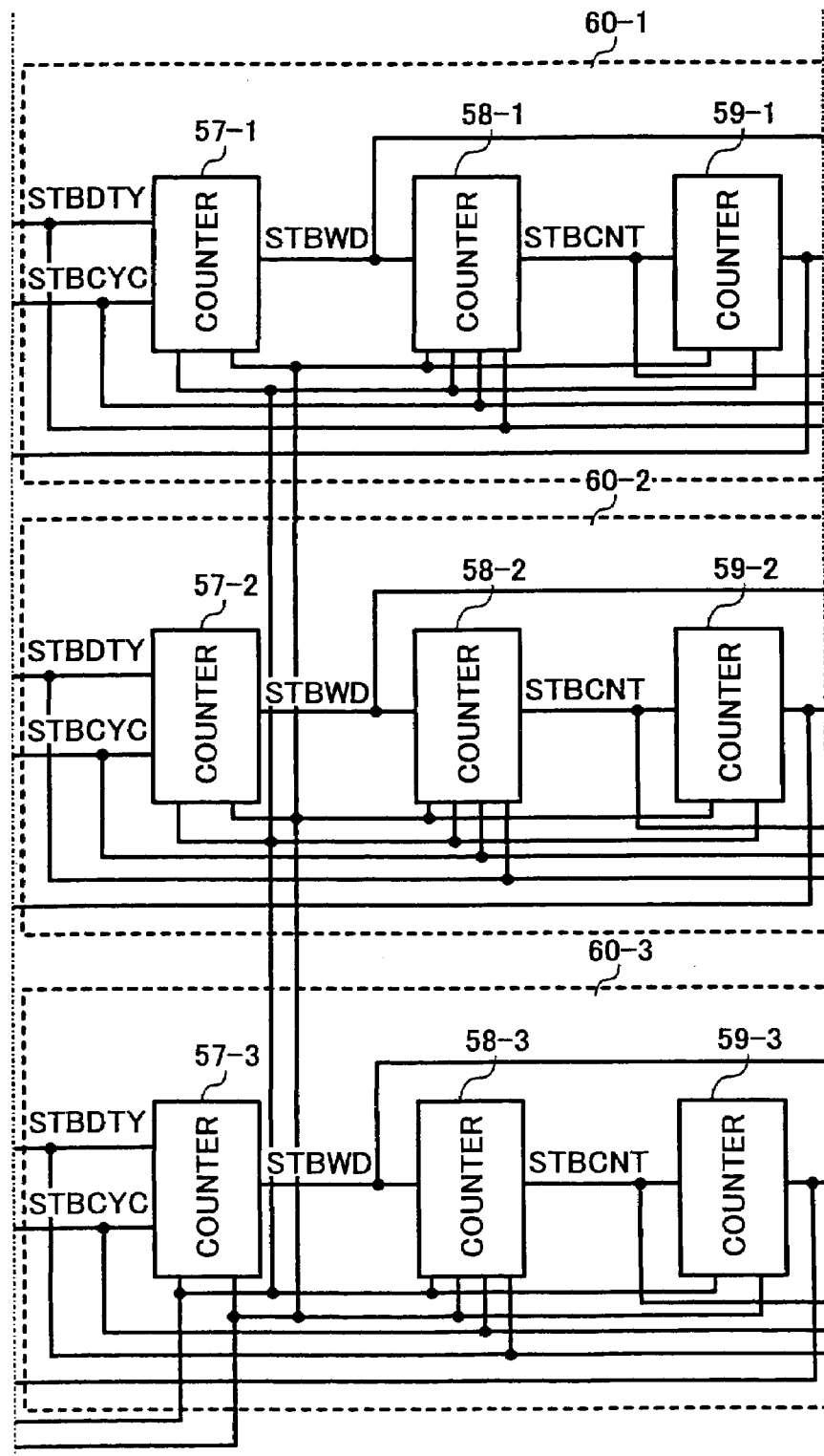
FIG. 6 is a circuit diagram showing a configuration of an illumination control circuit in the LED array unit.
Figure 6C:
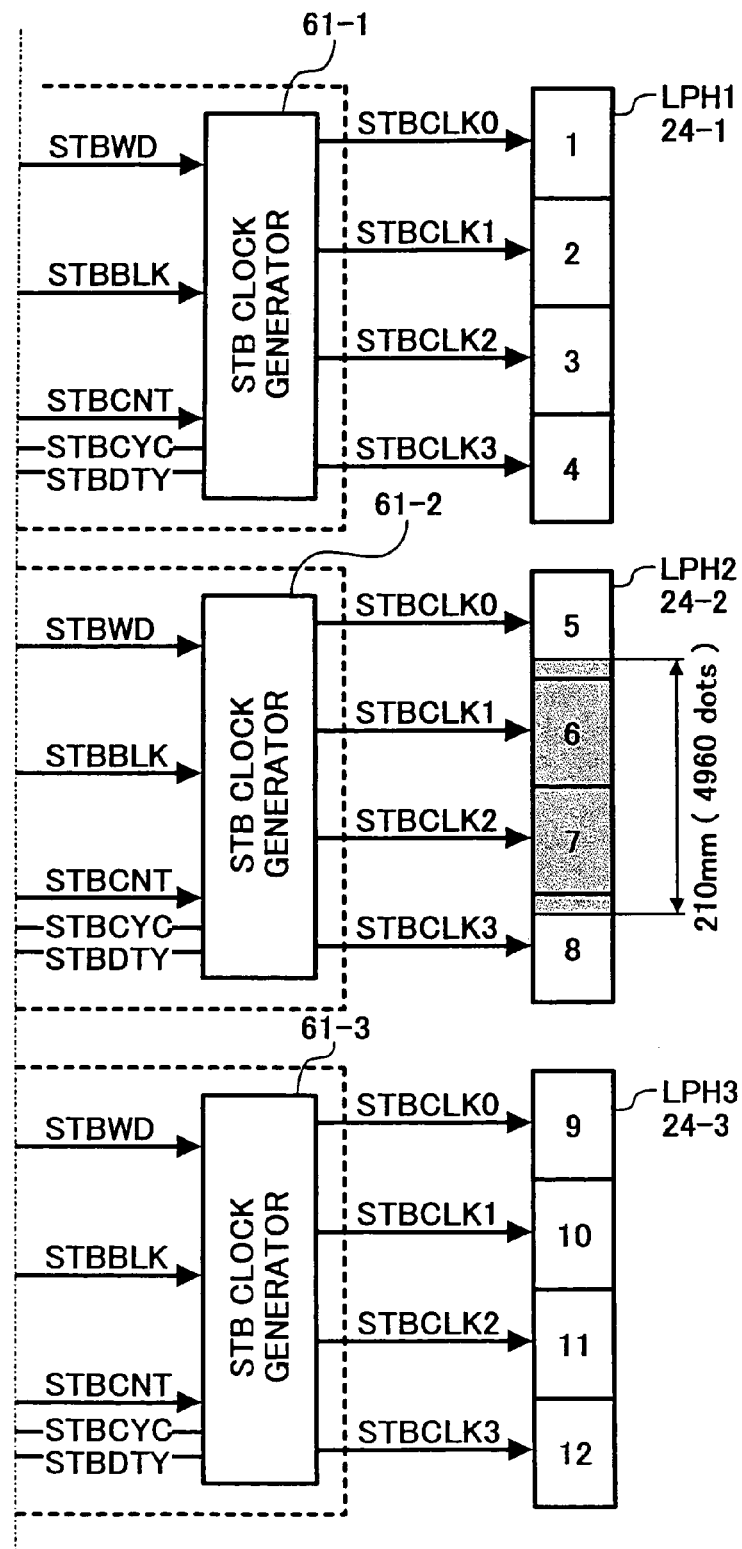

An illumination control circuit F for the LED array units will be described with reference to FIG. 6.

In the illumination control circuit F, after latching the data for one line in the direction of main scan by the drivers in the LED array units, clock illumination signals (STB: strobe signals) set for 32 counts are outputted in sequence for each of the divided areas in response to a main scan start signal. As a result, the LED's are illuminated and an image is printed. Additionally, one LED array unit is divided into four illumination areas for reducing a load imposed on the capacity of a power supply.

First, signals for setting a write start position and a write end position in the LED array units 24-1 to 24-3 corresponding to a sheet width are supplied from the system controller 2 and inputted to the LED write control circuit 25, whereupon the internal IC executes address setting for the SRAM's. Then, a register circuit in the LED write control circuit 25 outputs a start-of-write address and an end-of-write address. The outputted start-of-write address and end-of-write address are inputted to a selector 55, shown in FIG. 6, to select which ones of the illumination areas in the LED array units 24-1 to 24-3 are to be used. Subsequently, divided area signals 1 to 12 are outputted from the first IC 33 to enter selectors 56-1 to 56-3 in the next stage. Subsequent control processes are the same in the three LED array units, and hence control of the selector 56-2, i.e., the LED array unit 24-2, will be described below.

The divided area signals 5 to 8 from the selector 55 are inputted to the selector 56-2. Further, signals are inputted to the selector 56-2 from 1-clock cycle registers STBCYC (NOR, ST, END) (62 in FIG. 6) and from clock period registers STBDTY (NOR, ST, END) (62 in FIG. 6) for 32 clocks with respect to illumination duty, and are compared with the divided area signals 5 to 8 to select which ones of setting values in the registers STBCYC and STBDTY are to be used. The selected setting values are then outputted.

When printing an image with a width of 210 mm, the LED array unit used in this case is 24-2 and the divided areas 5 to 8 are employed. Based on the register start and end addresses (corresponding to the start-of-write address and the end-of-write address), the registers to be used are selected as follows. Because the image region in the direction of main scan starts in the divided area 5, the cycle register STBCYC_ST and the clock period register STBDTY_ST are selected for the divided area 5.

Also, the cycle register STBCYC_NOR and the clock period register STBDTY_NOR are selected for the divided areas 6 and 7. Further, the cycle register STBCYC_END and the clock period register STBDTY_END are selected for the divided area 8 in which the image region in the direction of main scan ends.

The cycle STBCYC and the period STBDTY for one clock selected by the selector 56-2 are inputted to a STB clock circuit 60-2. In the STB clock circuit 60-2, an image start signal RLSYNC and a reference sync signal SYSCK both generated from the first IC 33 in the LED write control circuit 25 are inputted to a counter 57-2 for increment of its count, thereby outputting a counter signal STBWD.

The counter signal STBWD serves as an internal counter signal for 1 clock of illumination strobe outputted to the LED array unit. The counter 57-2 is reset with the cycle STBCYC for 1 clock of strobe selected by the selector 56-2.

Then, the counter signal STBWD and the register signal STBCYC are inputted to a counter 58-2 from which a counter signal STBCNT is outputted. The counter 58-2 is reset when the count reaches 32 (0–31).

Subsequently, each time the counter 58-2 reaches the count 32, the counter signal STBCNT is inputted to a counter 59-2 from which a counter signal STBBLK is outputted based on the counter signal STBCNT. The counter 59-2 is reset when the count reaches 4 (STBBLK0–3).

The counter signal STBBLK is fed back to the selector 56-2. The signals generated from the counters 57-2, 58-2 and 59-2 are inputted to an STB clock generator 61-2 from which four illumination signals (STBCLK0–3) are outputted.

A manner of setting the cycle STBCYC for 1 clock of strobe and the period STBDTY for the intermediate count value will be described below.

The illumination time of the LED head is set in the range of 8% to 15% with respect to the main scan period. Assuming the illumination time to be 10%, for example, when the main scan period is 470.3 μS, the strobe block cycle is 47.03 μS and contains 32 clocks. The cycle of one clock is therefore 47.03 μS/32 clocks, i.e., 1.47 μS.

Because the reference sync clock SYSCK is 19 MHz and has a cycle of 0.052 μS, the cycle 1.47 μS of one clock corresponds to 28 counts of the reference sync clock SYSCK (counter signals STBWD0–27). Accordingly, the setting value of the cycle STBCYC for 1 clock of strobe is 27 and the setting value of the period STBDTY for the intermediate count value is 13.

The LED illumination time control will be described below with reference to FIG. 7.

Figure 7:
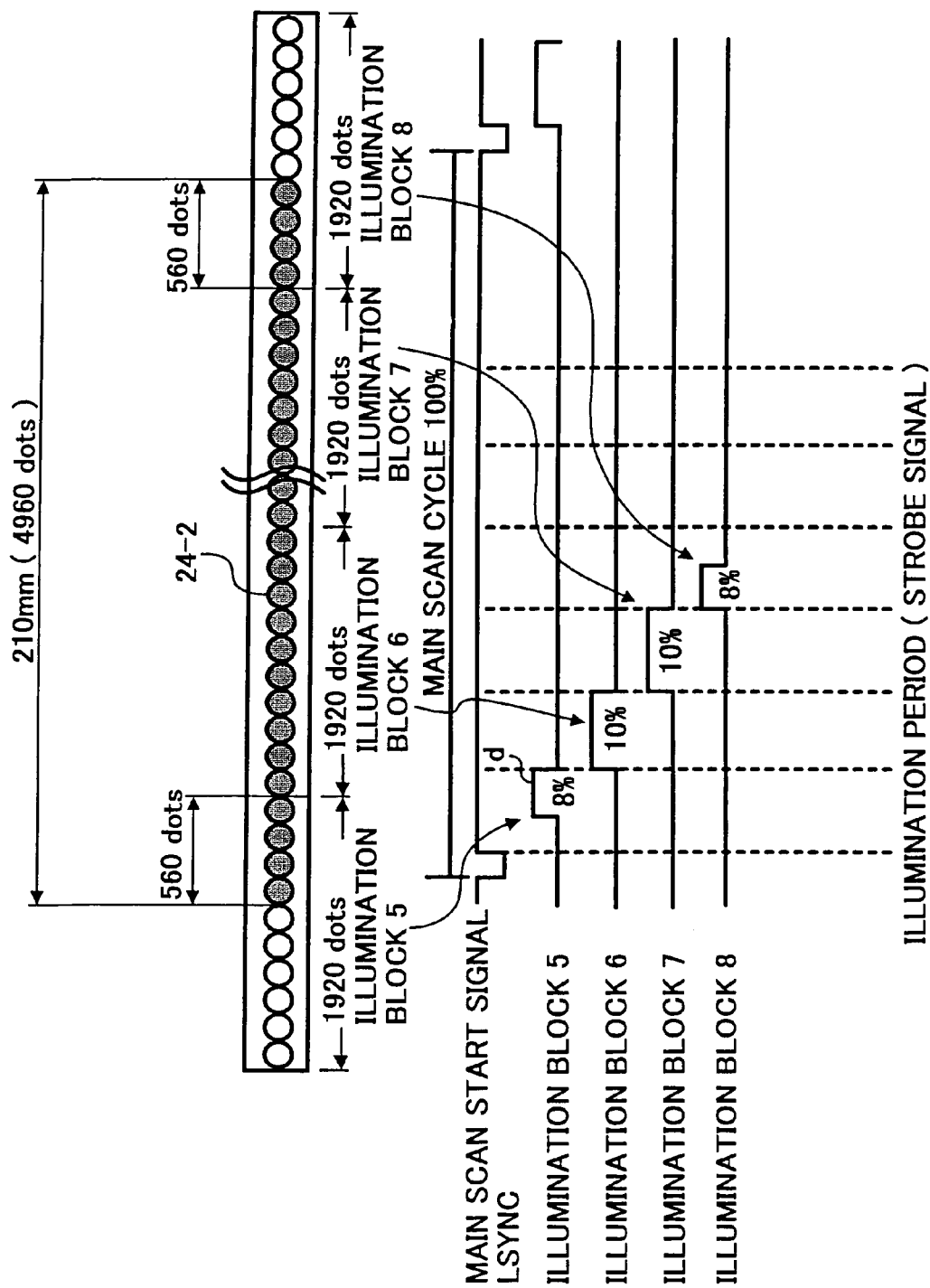
FIG. 7 is a chart for explaining control of an LED illumination time in the LED array unit.

As shown in FIG. 7, in the case of printing an image over an A-series regular (A4) size of 210 mm (4960 dots), the LED array unit 24-2 is selected for use and the divided areas 5 to 8 are employed. When the printing region is designated to be not more than a half (predetermined amount) of one illumination block based on the register start and end addresses, the illumination time of that illumination block is controlled to change the intensity of light emitted from the LED's.

In this case, the printing region of the illumination block 5 in which the image region in the direction of main scan starts contains dots in number less than those contained in the half of the illumination block. Therefore, if the illumination duty is set to the same value as that for the illumination blocks 6 and 7, a larger current is supplied to the illumination block 5 to increase the intensity of emitted light due to a difference in voltage drop caused by, e.g., a difference in impedances of cables extended from the power supply.

When printing a half-tone image, therefore, the illumination block 5 provides a darker image, i.e., a higher image density, than the adjacent inner illumination block 6 such that unevenness in the image density becomes noticeable. To avoid that drawback, the illumination duty is controlled down to 8% so as to provide the same image density as that provided by the illumination block 6. The illumination block 8 corresponding to the divided area 8, in which the image region ends, is similarly controlled to emit light at the illumination duty of 8%. The illumination blocks 6 and 7 corresponding to the divided areas 6 and 7 are controlled to emit light at the illumination duty of 10%.

Figure 8A:
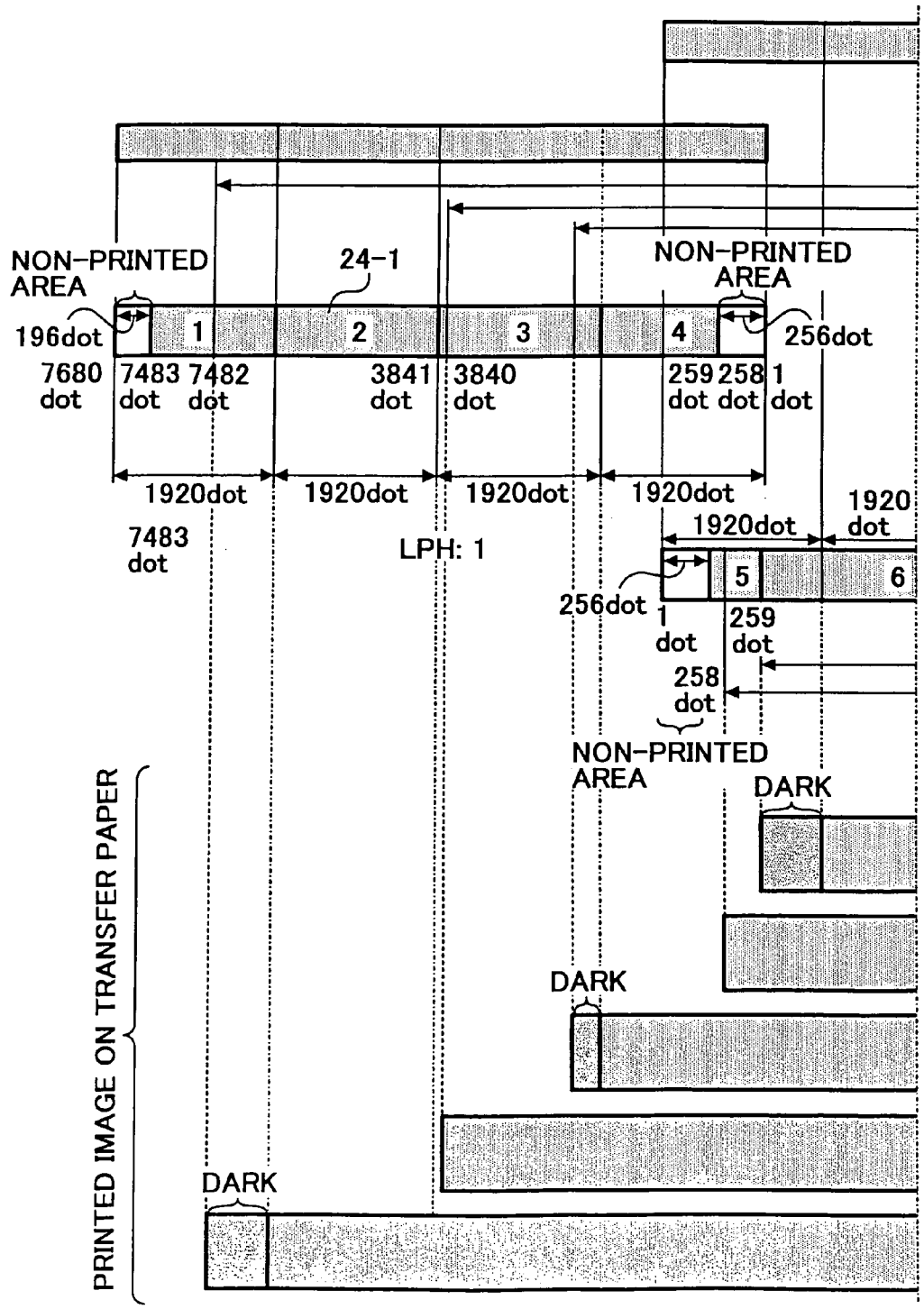
FIG. 8 is an illustration for explaining printed areas of transfer paper at opposite ends.
Figure 8B:
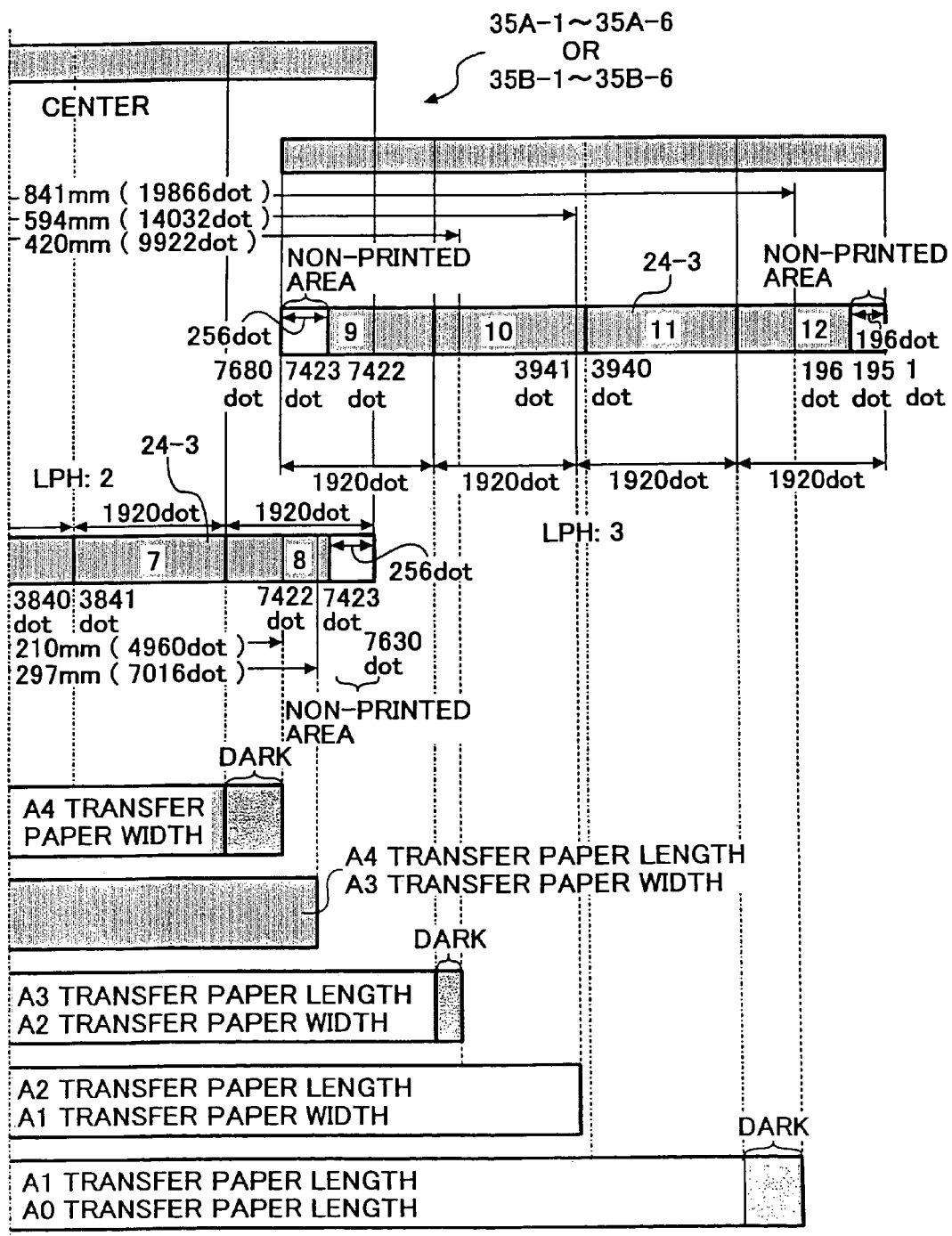

Printing regions of transfer paper at the opposite ends thereof will be described below with reference to FIG. 8.

The amount by which the illumination duty is reduced must be adjusted depending on the printing regions of transfer paper at the opposite ends thereof. As shown in FIG. 8, in the case of an A4 transfer paper in a landscape (horizontal) orientation (A4 transfer paper length) and an A2 transfer paper in a landscape orientation (A2 transfer paper length), the difference between the outer divided area and the inner divided area in actual use is small and hence the adjustment is not particularly required. In the case of an A4 transfer paper in a portrait (vertical) orientation (A4 transfer paper width), an A3 transfer paper in a landscape orientation (A3 transfer paper length), and an A1 transfer paper in a landscape orientation (A1 transfer paper length), however, the illumination duty is reduced. The amount by which the illumination duty is reduced is set to increase as the printing region becomes smaller with respect to the whole of one divided area as in the case of the A3 transfer paper in a landscape orientation (A3 transfer paper length).

As described above, the present invention has the following advantageous features.

(1) The LED printer of the present invention includes an LED illumination control circuit for controlling the intensity of emitted light for each of multiple areas energized to illuminate at a time, which are obtained by dividing an overall area of each of LED array units energized to illuminate at a time, and an LED illumination control circuit for controlling the intensity of emitted light for each of the LED array units. It is therefore possible to eliminate unevenness in the intensity of emitted light depending on positions over all of the illumination areas divided in the direction of main scan.

(2) Also, since the intensity of light emitted from the area energized to illuminate at a time are controlled depending on a difference in the illumination areas and a difference in the LED array units independently of each other or in a combined way, unevenness in the intensity of emitted light in the direction of main scan can be eliminated.

(3) Further, since LED illumination control for controlling the intensity of emitted light is made so as to reduce the intensity of emitted light when the area energized to illuminate at a time is relatively small, unevenness in the intensity of emitted light in the direction of main scan can be eliminated.

(4) An image forming apparatus employing the LED printer of the present invention, set forth above, in its write section provides a high quality image and is inexpensive.

Various modifications will become possible for those skilled in the art after receiving the teachings of the present disclosure without departing from the scope thereof.

What is claimed is:

1. A light emitting diode (LED) printer for writing a digital image on an image carrier of an image forming apparatus, said LED printer comprising:

LED array units, each unit made up of an LED array having a plurality of LED's arrayed to lie in one direction and focusing means for focusing light from said LED array onto said image carrier;

image data transfer control means for dividing and transferring image data, which has been transferred to said image data transfer control means, for each of a plurality of said multiple LED array units arranged in a zigzag pattern in an axial direction of said image carrier;

dividing means for dividing an area of said LED array unit energized to illuminate at a time into plural parts;

first LED illumination control means for controlling the intensity of emitted light for each of the areas energized to illuminate at a time; and second LED illumination control means for controlling the intensity of emitted light for each of said LED array units.

2. The LED printer according to claim 1, wherein said first and second LED illumination control means are constructed to control the intensity of light emitted from the area energized to illuminate at a time depending on a difference in the intensity of emitted light for each of the illumination areas and for each of said LED array units.

3. The LED printer according to claim 2, wherein said first and second LED illumination control means are further constructed to control the intensity of emitted light to be reduced in a place where the area energized to illuminate at a time is relatively small.

4. An image forming apparatus for forming a digital image, comprising:

an image carrier on which said digital image is formed; and a light emitting diode (LED) printer for writing said digital image on said image carrier, said LED printer comprising multiple LED array units, each unit made up of an LED array having a plurality of LED's arrayed to lie in one direction and focusing means for focusing light from said LED array onto said image carrier; image data transfer control means for dividing and transferring image data, having been transferred to said image data transfer control means, for each of a plurality of said multiple LED array units arranged in a zigzag pattern in an axial direction of said image carrier; dividing means for dividing an area of said LED array unit energized to illuminate at a time into plural parts; first LED illumination control means for controlling the intensity of emitted light for each of the areas energized to illuminate at a time; and second LED illumination control means for controlling the intensity of emitted light for each of said LED array units.

5. A light emitting diode (LED) printer for writing a digital image on an image carrier of an image forming apparatus, said LED printer comprising:

multiple LED array units, each made up of an LED array having a plurality of LED's arrayed to lie in one direction and a focusing device configured to focus light from said LED array onto said image carrier;

an image data transfer control device configured to divide and transfer image data, which has been transferred to said image data transfer control device, for each of a plurality of said multiple LED array units arranged in a zigzag pattern in an axial direction of said image carrier;

a dividing device configured to divide an area of said LED array unit energized to illuminate at a time into plural parts;

a first LED illumination control device configured to control the intensity of emitted light for each of the areas energized to illuminate at a time; and a second LED illumination control device configured to control the intensity of emitted light for each of said LED array units.

6. The LED printer according to claim 5, wherein said first and second LED illumination control devices are constructed to control the intensity of light emitted from the area energized to illuminate at a time depending on a difference in the intensity of emitted light for each of the illumination areas and for each of said LED array units.

7. The LED printer according to claim 6, wherein said first and second LED illumination control devices are further constructed to control the intensity of emitted light to be reduced in a place where the area energized to illuminate at a time is relatively small.

8. An image forming apparatus for forming a digital image, comprising:

an image carrier on which said digital image is formed; and a light emitting diode (LED) printer for writing said digital image on said image carrier, said LED printer comprising multiple LED array units, each unit made up of an LED array having a plurality of LED's arrayed to lie in one direction and a focusing device configured to focus light from said LED array onto said image carrier; an image data transfer control device configured to divide and transfer image data, having been transferred to said image data transfer control device, for each of a plurality of said multiple LED array units arranged in a zigzag pattern in an axial direction of said image carrier; a dividing device configured to divide an area of said LED array unit energized to illuminate at a time into plural parts; a first LED illumination control device configured to control the intensity of emitted light for each of the areas energized to illuminate at a time; and a second LED illumination control device configured to control the intensity of emitted light for each of said LED array units.

9. A method of writing a digital image on an image carrier of an image forming apparatus, said method comprising the steps of:

providing multiple LED array units, each unit made up of an LED array having a plurality of LED's arrayed to lie in one direction and focusing means for focusing light from said LED array onto said image carrier;

dividing and transferring image data, which has been transferred to said image data transfer control means, for each of a plurality of said multiple LED array units arranged in a zigzag pattern in an axial direction of said image carrier;

dividing an area of said LED array unit energized to illuminate at a time into plural parts;

controlling the intensity of emitted light for each of the areas energized to illuminate at a time; and controlling the intensity of emitted light for each of said LED array units.

10. The method according to claim 9, wherein the intensity of light emitted from the area energized to illuminate at a time is controlled in accordance with a difference in the intensity of emitted light for each of the illumination areas and for each of said LED array units.

11. The method according to claim 10, wherein the intensity of emitted light is reduced in a place where the area energized to illuminate at a time is relatively small.

* * * * *